US006741435B1

(12) United States Patent
Cleveland

(10) Patent No.: US 6,741,435 B1
(45) Date of Patent: May 25, 2004

(54) POWER CONTROLLER WITH DC ARC-SUPRESSION RELAYS

(75) Inventor: Andrew J. Cleveland, Reno, NV (US)

(73) Assignee: Server Technology, Inc., Reno, NV (US)

( * ) Notice: Subject to any disclaimer, the term of this patent is extended or adjusted under 35 U.S.C. 154(b) by 595 days.

(21) Appl. No.: 09/689,157

(22) Filed: Oct. 12, 2000

Related U.S. Application Data

(60) Provisional application No. 60/224,387, filed on Aug. 9, 2000.

(51) Int. Cl.[7] .................................................. H02H 3/00

(52) U.S. Cl. ................................ 361/2; 361/8; 361/13; 361/58

(58) Field of Search ................................ 361/2–13, 58, 361/115

(56) References Cited

U.S. PATENT DOCUMENTS 4,598,330 A * 7/1986 Woodworth ................. 361/13
4,959,746 A * 9/1990 Hongel ........................ 361/13
5,822,563 A * 10/1998 Sitbon et al. ............... 709/330

* cited by examiner

*Primary Examiner*—Stephen W. Jackson
(74) *Attorney, Agent, or Firm*—Nath & Associates PLLC; Robert C. Ryan; Marvin C. Berkowitz

(57) ABSTRACT

A DC arc-suppressor for network appliance power managers comprises an electromechanical relay that controls the flow of battery power to a network appliance by remote control. The relay includes electrical contacts that open to interrupt the flow of current in response to an off-command signal. A transistor is connected in shunt across the relay contacts to temporarily divert such flow of current. A timing circuit is connected to respond to the off-command signal by first turning on the shunt transistor, then open the relay contacts, then turn off the shunt transistor. Such shunt transistor is sized to carry the full rated power of the relay contacts, but only for the few milliseconds that are needed to allow the relay contacts to fully separate.

12 Claims, 2 Drawing Sheets

POWER CONTROLLER WITH DC ARC-SUPRESSION RELAYS

This application claims the benefit of provisional application Ser. No. 60/224,387 filed Aug. 9, 2000.

BACKGROUND OF THE INVENTION

1. Field of the Invention

The invention relates generally to computer network power controllers and more particularly to high-amperage 48-volt DC circuit relay arc-suppression.

2. Description of the Prior Art

There is a growing need for competitive local exchange carriers to manage remote power control functions of internetworking devices at telephone company (telco) central offices. Competitive local exchange carriers (CLECs), incumbent local exchange carriers (ILECs), independent telephone companies, and other next generation service providers are now all offering a digital subscriber line (DSL) service that promises high-speed Internet access for both homes and businesses. DSL is expected to replace integrated services digital network (ISDN) equipment and lines, and DSL competes very well with the T1 line that has historically been provided by ILECs. A DSL drop costs about $40–60 per month, and is expected to quickly become the dominant subscriber-line technology.

The DSL service is provided by a switch that is co-located in a telco central office, i.e., a digital subscriber line access multiplexer (DSLAM). Many new competitive local exchange carriers are now deploying DSL service in several states. They are installing digital subscriber line access multiplexers in many locations. Such digital subscriber line access multiplexers are now available from a number of different manufacturers, e.g., Paradyne, Copper Mountain, Ascend, etc.

Nearly all such digital subscriber line access multiplexers are powered by 48-VDC battery power and all have operator console ports. And for emergencies, these DSLAMs usually have two independent 48-VDC battery power supplies, e.g., an A-channel and a B-channel. Most commercial DSLAMs are also controlled by large operating systems that host various application software. Unfortunately, this means most DSLAMs have the potential to fail or lock-up, e.g., due to some software bug.

When a digital subscriber line access multiplexer does lock-up, the time-honored method of recovering is to cycle the power, i.e., reboot. But when a digital subscriber line access multiplexer is located at a telco central office, such location practically prevents it being easy to reboot manually.

There are many large router and ATM switch farms around the country that are equipped by the leading vendors, e.g., Cisco, Bay Networks/Nortel, Ascend, Lucent, Fore, etc. So each of these too has the potential to lock-up and need rebooting, and each of these is very inconvenient to staff or visit for a manual reboot when needed.

Server Technology, Inc., (Sunnyvale, Calif.) markets a 48-VDC remote power manager and intelligent power distribution unit that provides for remote rebooting of remote digital subscriber line access multiplexers and other network equipment in telco central offices and router farms. The SENTRY 48-VDC is a network management center that eliminates the dispatching of field service technicians to cycle power and rectify locked-up digital subscriber line access multiplexers.

Statistics show that seventy percent, or more, of all network equipment lock-ups can be overcome by rebooting, e.g., cycling power off and on. A remote power controller, like the SENTRY, can reduce network outages from hours to minutes.

In a typical installation, the telco central office provides the competitive local exchange carriers with bare rack space and a 48-VDC power feed cable that can supply 60–100 amps. The single power input is conventionally distributed through a fuse panel to several digital subscriber line access multiplexers in a RETMA-type equipment rack. Individual fuses in such fuse panel are used to protect each DSLAM from power faults.

But such fuses frequently weld themselves to their sockets in the fuse panel due to loose contacts and high amperage currents. It is ironic therefore that many digital subscriber line access multiplexers do not have power on/off switches. Thus it requires the fuse to be pried out and put back in so the DSLAM can be powered-off for rebooting. But when the fuse is welded, removing the fuse without damaging the fuse panel can be nearly impossible.

The Server Technology SENTRY 48-VDC accepts from the telco or other site host an A-power feed cable and B-power feed cable. Internally, DC-power is distributed to a set of “A” and “B” rear apron output terminal blocks that are protected by push-to-reset circuit breakers. The fuse panel is no longer required. The A-feed and B-feed are then matched to the newer digital subscriber line access multiplexers that also require A-power supply and B-power supply inputs.

Sometimes digital signaling lines can lose the carrier. In such cases, the respective DSLAM must be rebooted to restore the DS3 line. A technician is conventionally required to visit the DSLAM, and use a console port to monitor how the software reboots, and if communications are correctly restored to the DS3.

A SENTRY 48-VDC can be used to remotely power-off the digital subscriber line access multiplexer in the event the carrier is lost. A companion asynchronous communications switch can be used to establish a connection to the DSLAM’s console port. Power can be cycled to the DSLAM, and the asynchronous communications switch used to monitor the reboot operation to make certain that the carrier to the DS3 line is restored. The asynchronous communications switch is a low-cost alternative to the expensive terminal server typically used for console port access. The reboot process and the console port monitoring process can both be managed from an operations center, without the need to dispatch technical personnel to the remote location.

The floor space that a competitive local exchange carrier’s equipment rack sits upon is very expensive, so the equipment stuffed in the vertical space in a rack (“U-space”) must be as compact as possible. A typical rack may house several digital subscriber line access multiplexers, a terminal server, a fuse panel, and 48-VDC modems. A SENTRY 48-VDC uses “3U” (5.25 inches) of vertical RETMA-rack space, and combines the functions of a fuse panel, a terminal server, and a modem. As many as eight 20-amp devices, or four 35-amp devices can be supported.

Power controllers, like the Server Technology SENTRY, use electromechanical relays to open and close the 48-volt supply lines to the network equipment. Unfortunately, the same physical phenomena that welds the fuses in their holders can also weld or destroy the contacts of these relays.

Most electric welders generate the high heats necessary to fuse metal together by arcing a direct current (DC) low voltage (under 50-volts) and high current (over 50-amps) across an electrode gap. Such conditions occur in a power controller’s relay, especially when the relay contacts are opening. The mass inertia of the contact mechanism has to be overcome before the contacts can open. The contacts accelerate apart, but are moving only very slowly at the start. Electric arcs, once generated, will continue even though the electrode separation distance is increased. This is the so-called Jacob's Ladder effect. The ionized air and the heated contacts increase the distance an arc can bridge. The arcing stops only after the contacts are very wide apart.

In contrast, a pair of open relay contacts will not arc until the contacts get very close to one another. By this time, the contact closure is moving at its near maximum velocity. So the remaining gap that needs to be closed up when the arc commences will vanish quickly.

SUMMARY OF THE PRESENT INVENTION

It is therefore an object of the present invention to provide a DC arc-suppressor for network appliance power managers.

It is another object of the present invention to provide a power controller with long-lasting and reliable relay operation.

Briefly, a DC arc-suppressor embodiment of the present invention for network appliance power managers comprises an electromechanical relay that controls the flow of battery power to a network appliance by remote control. The relay includes electrical contacts that open to interrupt the flow of current in response to an off-command signal. A transistor is connected in shunt across the relay contacts to temporarily divert such flow of current. A timing circuit is connected to respond to the off-command signal by first turning on the shunt transistor, then open the relay contacts, then turn off the shunt transistor. Such shunt transistor is sized to carry the full rated power of the relay contacts, but only for the few milliseconds that are needed to allow the relay contacts to fully separate.

An advantage of the present invention is that a DC arc-suppressor is provided for network appliance power managers.

Another advantage of the present invention is that a power controller is provided for network appliances.

These and many other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENTS

Figure 1:
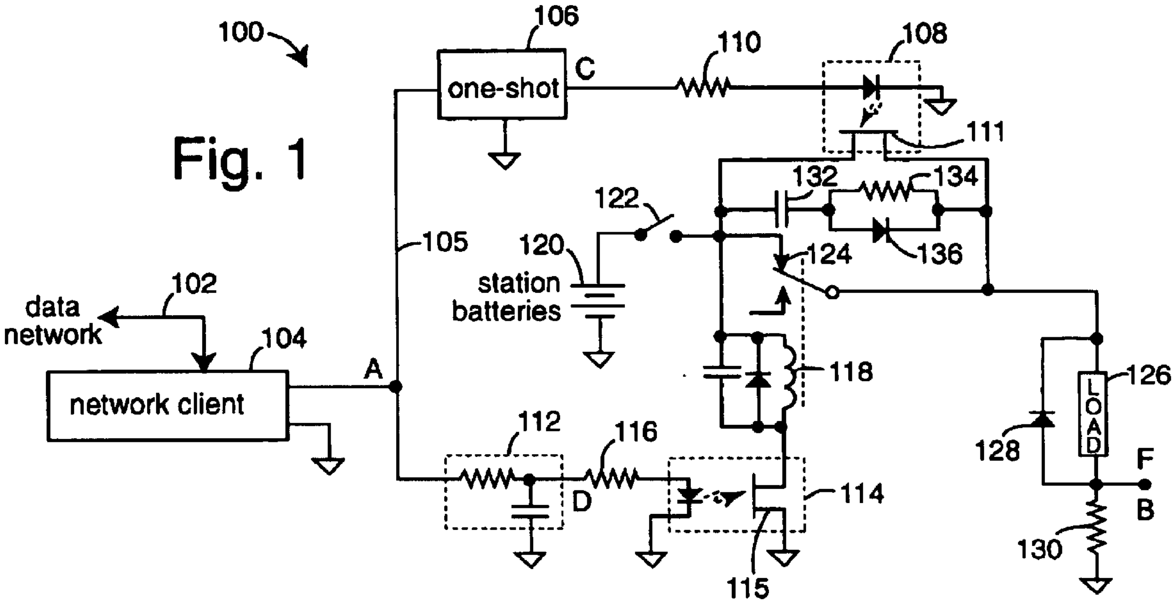
FIG. 1 is schematic diagram of a power controller embodiment of the present invention that includes a DC arc-suppression circuit.

FIG. 1 illustrates a power controller embodiment of the present invention, referred to herein by the general reference numeral 100. The power controller 100 connects to a computer data network 102, e.g., the Internet, and can send status and receive commands with a network client 104. A power-OFF command raises a signal line 105 and triggers a one-shot multivibrator 106. A twenty millisecond long pulse is fed to an opto-isolator 108 through a dropping resistor 110. This turns-on a power metal-oxide-semiconductor field-effect transistor (MOSFET) 111.

The raising of signal line 105 by the power-OFF command also is fed through a two-millisecond delay circuit 112 and is forwarded to another opto-isolator 114 through a dropping resistor 116. A switch transistor 115 turns-on and energizes an inductive armature 118 in an electromechanical relay.

A set of station batteries 120, e.g., a 48-volt bank at a Telco Central Office, are connected through a master switch 122 and a pair of normally closed relay contacts 124 to a load 126. Network routers, bridges, and other computer network equipment are examples of what is represented by load 126. A suppression diode 128 helps control transients that occur across the load during the operation of the relay contacts 124. A sense resistor 130 is useful for the monitoring of load currents with a voltmeter or oscilliscope.

A conventional arc-suppression network comprising a capacitor 132, a resistor 134, and a diode 136, are connected across the relay contacts 124 to help control arcing and contact burning.

Figure 2:
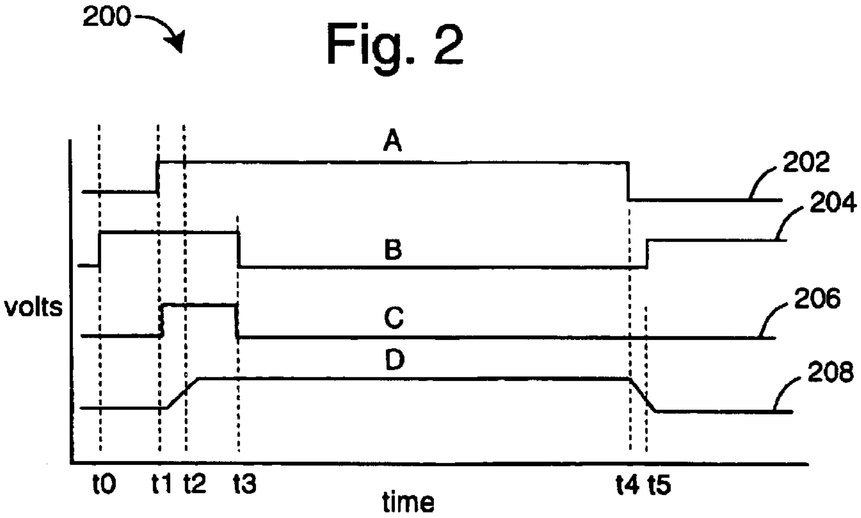
FIG. 2 is a timing diagram related to various signal points in FIG. 1.

FIG. 2 illustrates some of the critical signal timing that occurs in power controller 100 during operation. A signal-A 202 corresponds to the output of the network client 104, e.g., signal line 105. A signal-B 204 corresponds to the load output current, as seen as a voltage across sense resistor 130. A signal-C 206 corresponds to the output of the one-shot multivibrator 106. A signal-D 208 corresponds to the output of the delay circuit 112 as seen by the dropping resistor 116.

During operation, at a time t0, the power controller 100 is energized. At a time t1, the network client 104 receives a power-OFF command, and signal-A 202 is raised. This triggers the one-shot multivibrator 106 and causes a twenty millisecond pulse output to appear as signal-C 206. Such turns-on MOSFET power transistor 111. The signal-A 202 being raised also causes signal-D 208 to follow suit, but with a two millisecond delay. Such energizes relay 118 and pulls open contacts 124. The rising-edge delay of two-milliseconds is represented by the slope of signal-D between times t1 and t2. Signal-B 204 automatically falls back at time t3. The MOSFET power transistor 111 turns off, having done its job of shunting the load current while the relay contacts were breaking.

At time t4, the network client 104 receives a power-ON command, and signal-A 202 is lowered. This causes signal-D 208 to drop and the relay contacts 124 close at time t5. The one-shot multivibrator 106 is unaffected because it is positive-edge triggered only.

The one-shot multivibrator 106 can be implemented with a National Semiconductor NE555. The opto-isolatores 108 and 114 can comprise photo-relays.

Figure 3:
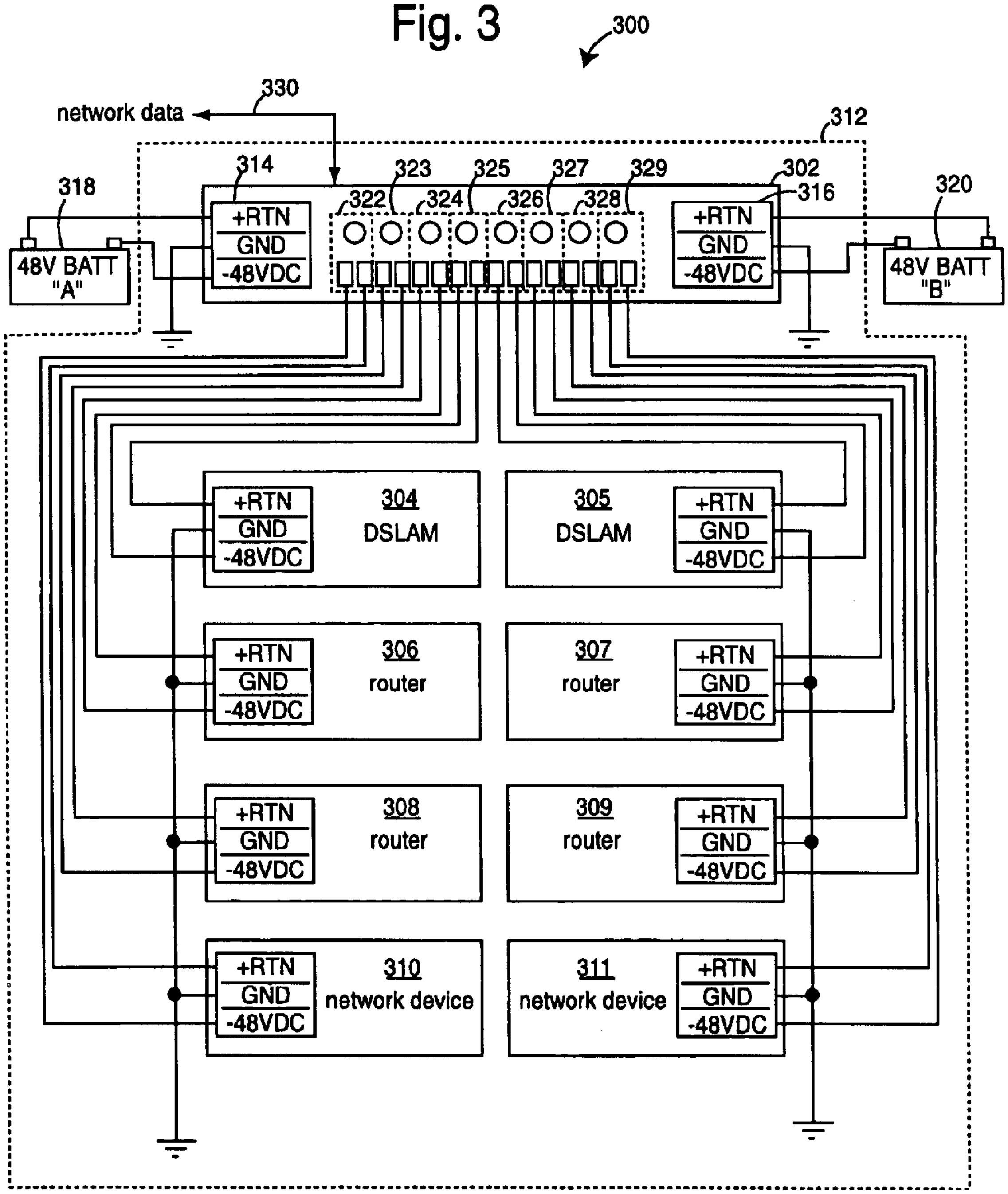
FIG. 3 is a functional block diagram that shows a dual-source battery power manager wired to power-cycle DSLAM, routers, and other network devices.

FIG. 3 represents a system 300 that includes a dual 100-amp battery source power manager 302 wired to power-cycle two DSLAMs 304 and 305, four routers 306, 307, 308 and 309, and two generic network devices 310 and 311.

The chassis are all mounted in a single RETMA-rack 312. An A-channel power connector 314 and a B-channel power connector 316 on the power manager 302 receive two circuits of 48-volt DC battery power from a telco site. A pair of batteries 318 and 320 represent these sources. A plurality of power control modules 322–329 internal to the power manager 302 are independently controlled from a network connection 330 and can individually control A-channel and B-channel DC-power supplied to each DSLAM 304 and 305, routers 306, 307, 308 and 309, and generic network devices 310 and 311. Such power control modules 322–329 include the DC arc-supression circuitry of FIG. 1.

When any of the DSLAMs 304 and 305, routers 306, 307, 308 and 309, and generic network devices 310 and 311 need to be remotely rebooted, an appropriate network data is sent to the responsible power control modules 322–329 to cause both A-channel and B-channel DC power to cycle off and on.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A DC-arc suppression circuit, comprising:

an electro-mechanical relay with a relay contact providing for direct current (DC) electricity to be controlled between a power source and an electrical load, and further comprising an inductive armature to open and close said relay contact;

a power transistor connected in electrical shunt with said relay contact and having an input for controlling a shunt current;

a timing circuit electrically connected to said inductive armature and connected to said input of the power transistor; and a power-control signal input electrically connected to the timing circuit;

wherein, when the timing circuit receives a command from the power-control signal input to interrupt a flow of power from said power source to said electrical load, said timing circuit first turns the power transistor on in response to said command, then opens said relay contact, and then turns the power transistor off.

2. The DC-arc suppression circuit of claim 1, wherein:

when the timing circuit receives a command from the power-control signal input to close-circuit a flow of power from said power source to said electrical load, it simply causes said relay contact to close and does not operate the power transistor.

3. The DC-arc suppression circuit of claim 1, wherein:

the power transistor is a MOSFET-type with its drain and source electrodes connected in parallel to said relay contact.

4. The DC-arc suppression circuit of claim 1, wherein:

the timing circuit is such that it includes a switch transistor to electrically control said inductive armature.

5. The DC-arc suppression circuit of claim 1, wherein:

the timing circuit is such that it provides about a two millisecond delay between a signal at the power-control signal input and its resulting operation of the relay.

6. The DC-arc suppression circuit of claim 1, wherein:

the timing circuit is such that it provides about a twenty millisecond long switch-ON pulse to the power transistor beginning at the arrival of an OFF-command signal at the power-control signal input.

7. The DC-arc suppression circuit of claim 1, wherein:

the power transistor is a MOSFET-type with its drain and source electrodes connected in parallel to said relay contact; and the timing circuit is such that it includes a switch transistor to electrically control said inductive armature, and it provides about a two millisecond delay between a signal at the power-control signal input and its resulting operation of the relay, and it further provides about a twenty millisecond long switch-ON pulse to the power transistor beginning at the arrival of an OFF-command signal at the power-control signal input.

8. A remote power controller, comprising:

a network client for sending and receiving power status and power control messages over a computer data network;

an electromechanical relay with a relay contact providing for direct current (DC) electricity to be controlled between a power source and an electrical load, and further comprising an inductive armature to open and close said relay contact;

a power transistor connected in electrical shunt with said relay contact and having an input for controlling a shunt current;

a timing circuit connected to receive a decoded power-ON command and a power-OFF command from the network client; and wherein, when the timing circuit receives said power-OFF command to interrupt a flow of power from said power source to said electrical load, it first turns on the power transistor, then opens said relay contact, and then turns the power transistor back off.

9. The remote power controller of claim 8, wherein:

when the timing circuit receives a command from the power-control signal input to close-circuit a flow of power from said power source to said electrical load, it simply causes said relay contact to close and does not operate the power transistor.

10. The remote power controller of claim 8, wherein:

the power transistor is a MOSFET-type with its drain and source electrodes connected in parallel to said relay contact.

11. The remote power controller of claim 8, wherein:

the power transistor is a MOSFET-type with its drain and source electrodes connected in parallel to said relay contact; and the timing circuit is such that it includes a switch transistor to electrically control said inductive armature, and it provides about a two millisecond delay between a signal at the power-control signal input and its resulting operation of the relay, and it further provides about a twenty millisecond long switch-ON pulse to the power transistor beginning at the arrival of an OFF-command signal at the power-control signal input.

12. A method for reducing the arcing of relay contacts carrying direct current electrical flows, the method comprising the steps of:

receiving at a control-signal input a control signal to electrically disconnect a load from a source of the direct current;

shunting the direct current around a pair of closed contacts in an electro-mechanical relay through a solid-state semiconductor device in response to said control signal to clamp the open-circuit voltage across said pair of contacts under load;

opening said pair of contacts in said electro-mechanical relay after shunting the direct current; and turning off said solid-state semiconductor device by a timing circuit electrically connected to the control-signal input to unclamp the open-circuit voltage across said pair of contacts under load after opening said pair of contacts;

wherein, any tendency of said pair of contacts in said electro-mechanical relay to arc when being opened is suppressed.

* * * * *